United States Patent [19]
Nachet

[11] 3,922,097
[45] Nov. 25, 1975

[54] OPTICAL APPARATUS FOR THE MICROSCOPIC EXAMINATION OF THE INTERNAL WALLS OF AN OPENING

[75] Inventor: Philippe Nachet, Neuilly, France

[73] Assignee: Societe d'Optique, Precision Electronique et Mecanique - Sopelem, Paris, France

[22] Filed: May 28, 1974

[21] Appl. No.: 473,999

[30] Foreign Application Priority Data
July 17, 1973 France .............................. 73.26099

[52] U.S. Cl. .................. 356/241; 128/4; 240/2 MA; 350/24; 350/96 T; 350/198; 351/24
[51] Int. Cl.² .......................................... G01N 21/16
[58] Field of Search ................ 351/23, 24; 356/247; 350/21-24, 55, 96 T, 198; 128/4-6; 240/2 MA

[56] References Cited
UNITED STATES PATENTS

| | | |
|---|---|---|
| 2,028,430 | 1/1936 | Baddorf et al. ........................ 350/24 |
| 2,312,192 | 3/1943 | Cassel ............................... 240/2 MA |
| 2,987,960 | 6/1961 | Sheldon ............................... 350/24 |
| 3,067,648 | 12/1962 | Cohen .................................. 128/4 X |
| 3,283,653 | 11/1966 | Tokarzewski ....................... 350/198 |
| 3,670,157 | 6/1972 | Bragg ................................. 350/96 T |

*Primary Examiner*—Alfred L. Brody
*Attorney, Agent, or Firm*—Cameron, Kerkam, Sutton, Stowell & Stowell

[57] ABSTRACT

A device for mounting in or incorporation in a microscope apparatus for examining the walls of orifices of small size, the device including a plurality of mirrors carried on a mount and inclined relative to a common axis toward which they face, the mirrors diverging from that axis in the direction of the apparatus and away from the orifice to be examined.

1 Claim, 3 Drawing Figures

U.S. Patent Nov. 25, 1975 3,922,097
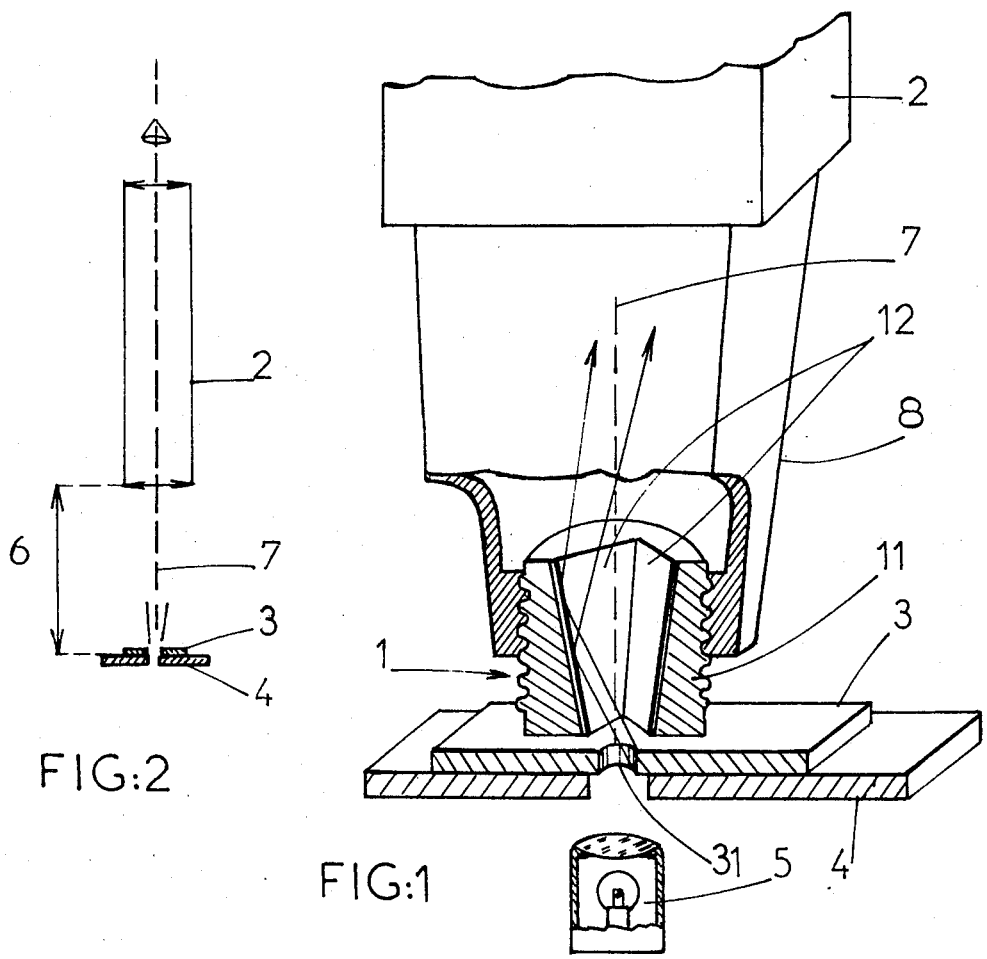
FIG:2
FIG:1
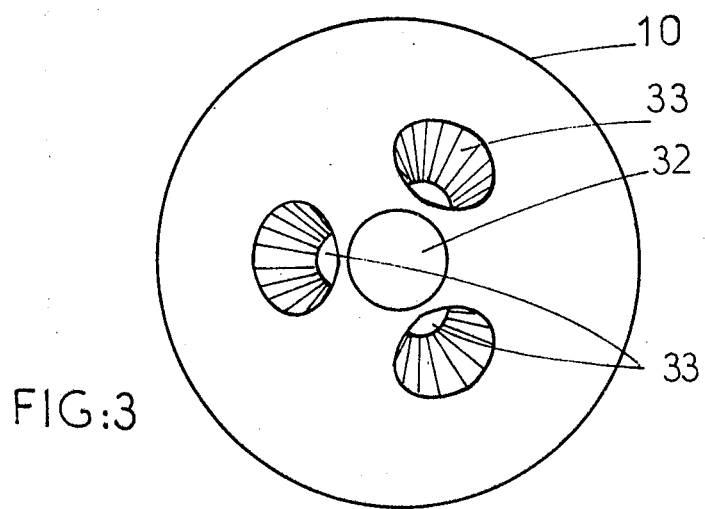
FIG:3

OPTICAL APPARATUS FOR THE MICROSCOPIC EXAMINATION OF THE INTERNAL WALLS OF AN OPENING

The present invention relates to an optical device adapted to a conventional optical apparatus for microscopic examination, for examining the inner walls of an orifice of small dimensions.

One possibility for microscopic examination of small holes consists of using a conventional optical instrument for microscopic examination and of positioning the part to be examined on an inclined support so that the side of the hole is inclined in relation to the optical axis. To examine the whole of the wall, the inclined support then has to be rotated. This method of examination is altogether unsuitable for large-sized parts.

Austrian Pat. No. 289,414 shows a device for the microscopic examination of the inner walls of a small orifice, comprising a microscope arranged on the axis of the orifice, devices for lighting the orifice, and a spherical reflecting mirror arranged below the orifice and making it possible to examine the walls. The image obtained with this device is not of good quality.

Another existing system has prisms that are arranged in such a way that at the eyepiece, the observer can see two opposite parts of the inner walls, the manual rotation of the prisms allowing the rest of the walls to be seen.

The invention aims at remedying the drawbacks of the examination processes referred to above.

According to the invention, there is provided an optical device for the microscopic examination of the inner walls of an orifice, comprising a mounting for location between the lens of a microscope apparatus and the orifice centred on the optical axis of the apparatus, and plane mirrors arranged in the mounting whose reflecting surfaces are turned towards an axis of the mounting which will be on the optical axis, the mirrors being inclined in relation to the mounting axis, so that the spacing of the mirrors from that axis in relation will decrease in the direction from the lens to the orifice.

The invention will now be described in greater detail by reference to an embodiment which is given by way of non-restrictive example and is represented on the attached drawings.

FIG. 1 shows an embodiment of the optical device according to the invention, associated with an apparatus for microscopic examination which is partially represented.

FIG. 2 represents diagrammatically the assembly comprising the device and the associated microscope.

FIG. 3 shows, seen from above in the field under observation, the image of the orifice in straight section and the images of the walls.

Referring to FIGS. 1 and 2, the optical device is indicated with the reference 1 and is shown associated with an apparatus 2 for microscopic examination which is known per se. This apparatus is focused on an orifice 31 of an object 3. The object 3 is supported on a plate 4. The orifice 31 whose wall is to be examined is illuminated by light transmitted by an electric lamp 5. Illumination by incident light can be provided.

The device 1 has a mounting 11 held by a support 8 forming part of the apparatus 2. This support could equally be independent of the said apparatus. The mounting has plane mirrors 12 whose reflecting surfaces are turned towards the optical axis 7. These mirrors 12 are inclined by an angle which is selected in relation to the optical axis so that their distance from the said axis decreases from the apparatus 2 toward the object 3.

The mounting 11 is mounted on the support 8 by means of a position-regulating mechanism. The mechanism may have conventional means of regulating the vertical position of the mounting 11 (along the optical axis) in relation to the support 8. It may also comprise means for regulating the position of the mounting 11 in a plane at right angles to the optical axis. It may also comprise means for regulating the slope of the mounting 11 in relation to the optical axis.

FIG. 3 represents images of the walls of the orifice 31 in the observed field 10. The central image 32 corresponds to the magnified image of the straight section of the orifice. Each image 33 represents a magnified part of the inner wall furnished by an opposite plane mirror 12. Any light ray coming from the inner wall of the orifice 31 is reflected by the opposite plane mirror, taken up by the lens and then by the eyepiece.

There are as many secondary images 33 as there are plane mirrors 12, the number of plane mirrors being determined to ensure vision of the whole of the walls in the same field. In practice, the mirrors 12 will for preference be three in number.

The regulation of the whole will now be described. Adjustment and focusing are carried out by the usual devices of the basic optical device 2. It will be appreciated that the instrument 2, which is to allow the observation of the orifice throughout the thickness 9 of the object must have a great depth of field. The vertical position of the device 1 is regulated in such a way that its base does not touch the object 3, which avoids all contact during the movement of the object. After focusing on the orifice has been carried out, any vertical shift of the mounting 11 in its support 8 modifies the spacing of the secondary images 33 in relation to central basic image 32. This feature makes it possible to regulate in the best possible way the positioning of the mirror support to obtain the spacing which is deemed to be the best, taking into account the diameter or the shape of the holes to be observed.

The modification of the spacing of the plane mirrors 12 in relation to the optical axis would also modify the position of the secondary images 33 in relation to the central image 32. The mirrors 12 can therefore have spacings that are equal or not equal in relation to the optical axis. The optical device could be provided with means allowing the regulation of the spacing of the mirrors 12. It could also be provided with means making it possible to regulate the slope of the mirrors 12.

The optical device associated with an apparatus for microscopic examination, makes it possible to examine the whole of the sides of an orifice of small dimensions, without its being necessary to alter the slope of the axis of the said orifice in relation to the optical axis of the apparatus. Another result obtained is that the use of the device on the apparatus for microscopic examination takes place without regulating the focusing of the apparatus that has been adopted to obtain the correct image of the orifice.

The above described apparatus makes it possible to examine the walls of holes of small dimensions which are preferably not blind or plugged, of different shapes, cylindrical or otherwise, smooth or otherwise and not exceeding a few millimetres in depth, made in parts of all sizes. The accessory lends itself to an optical apparatus for microscopic examination having great depth of field, viz: microscope, stereomicroscope, microprojector, etc. The device can be added to existing optical instruments, or it may form part of a complete apparatus making use of it. The practical applications are many. The assembly thus equipped is able to check the inner walls of small parts or holes in the electronic or mechanical industries etc.

What is claimed is:

1. Optical device for the microscopic examination of the inner walls of an orifice, comprising a mounting for location between a microscope apparatus and the orifice centered on the optical axis of the apparatus, and plane mirrors providing images of the walls of the orifice arranged in the mounting whose reflecting surfaces are turned towards an axis of the mounting which will be on the optical axis, the mirrors being inclined in relation to the mounting axis, so that the spacing of the mirrors from that axis in relation will decrease in the direction from the lens to the orifice.

* * * * *